(12) United States Patent
Casse et al.

(10) Patent No.: US 11,203,405 B2
(45) Date of Patent: Dec. 21, 2021

(54) AIRCRAFT COMPRISING A HOLD DOOR FITTED WITH AN IMPROVED SEALING SYSTEM

(71) Applicant: Airbus Operations S.A.S., Toulouse (FR)

(72) Inventors: Christophe Casse, Fenouillet (FR); Lionel Alonso, Colomiers (FR)

(73) Assignee: Airbus Operations S.A.S.

( * ) Notice: Subject to any disclaimer, the term of this patent is extended or adjusted under 35 U.S.C. 154(b) by 381 days.

(21) Appl. No.: 16/272,043

(22) Filed: Feb. 11, 2019

(65) Prior Publication Data
US 2019/0256186 A1 Aug. 22, 2019

(30) Foreign Application Priority Data
Feb. 19, 2018 (FR) ...................................... 18 51418

(51) Int. Cl.
*B64C 1/14* (2006.01)
*F16J 15/06* (2006.01)
*F16J 15/48* (2006.01)

(52) U.S. Cl.
CPC .......... *B64C 1/1461* (2013.01); *B64C 1/1415* (2013.01); *F16J 15/065* (2013.01); *F16J 15/48* (2013.01)

(58) Field of Classification Search
CPC ... B64C 1/1461; B64C 1/1423; B64C 1/1407; B64C 1/1415; B64C 1/143; F16J 15/065; F16J 15/48
See application file for complete search history.

(56) References Cited

U.S. PATENT DOCUMENTS

| 2008/0164373 | A1* | 7/2008 | Roming | B64C 1/14 244/129.5 |
| 2014/0345199 | A1* | 11/2014 | Yahata | B64C 1/14 49/475.1 |
| 2016/0137043 | A1* | 5/2016 | Baba | B60J 10/80 49/483.1 |
| 2017/0369146 | A1 | 12/2017 | Perez | |
| 2018/0030762 | A1* | 2/2018 | Schwab | B64C 1/1407 |

FOREIGN PATENT DOCUMENTS

DE 10 2006 056137 A1 5/2008
DE 10 2014 109108 A1 1/2016

* cited by examiner

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

An aircraft includes first and second zones, and a sealing system, interposed between a doorframe and a door providing access to the second zone, including: a peripheral seal secured to the door, a stop secured to the doorframe, and including a body in the form of at least one plate which extends around the perimeter of the doorframe, parallel to the door when the door is in the closed position, a peripheral groove positioned on the stop in such a way that the peripheral seal closes off the peripheral groove around the perimeter of the opening when the door is in the closed position, and at least one passage configured to cause the peripheral groove and the first zone to communicate.

8 Claims, 2 Drawing Sheets

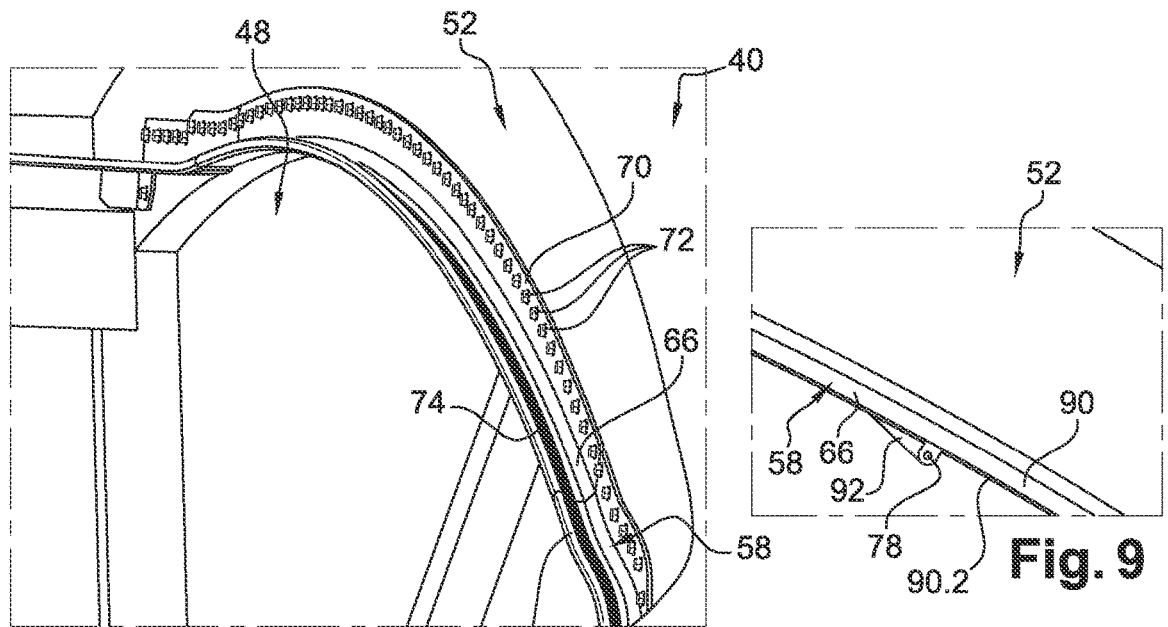
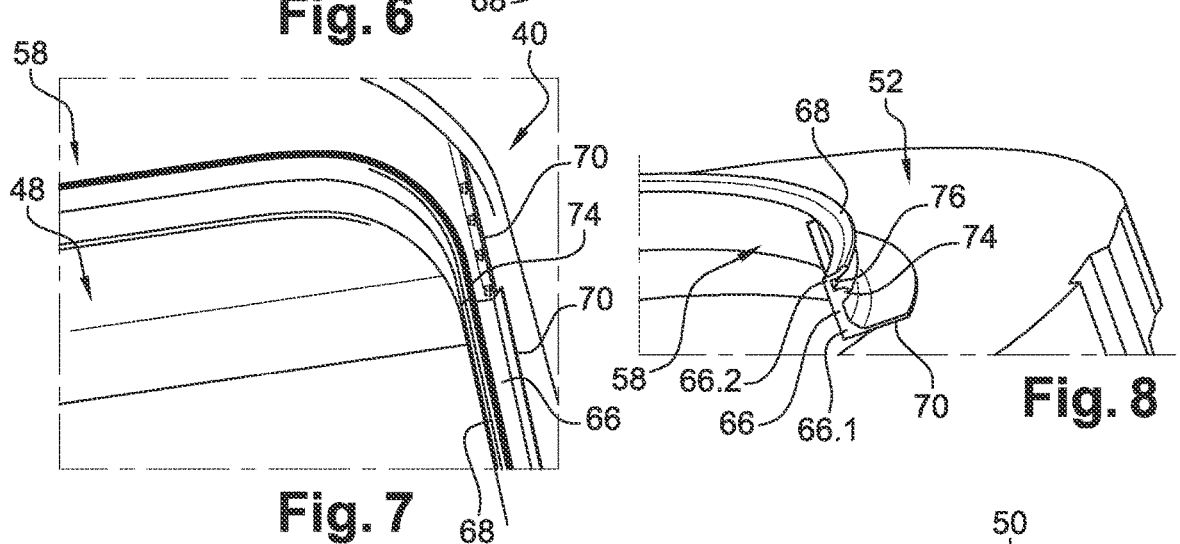
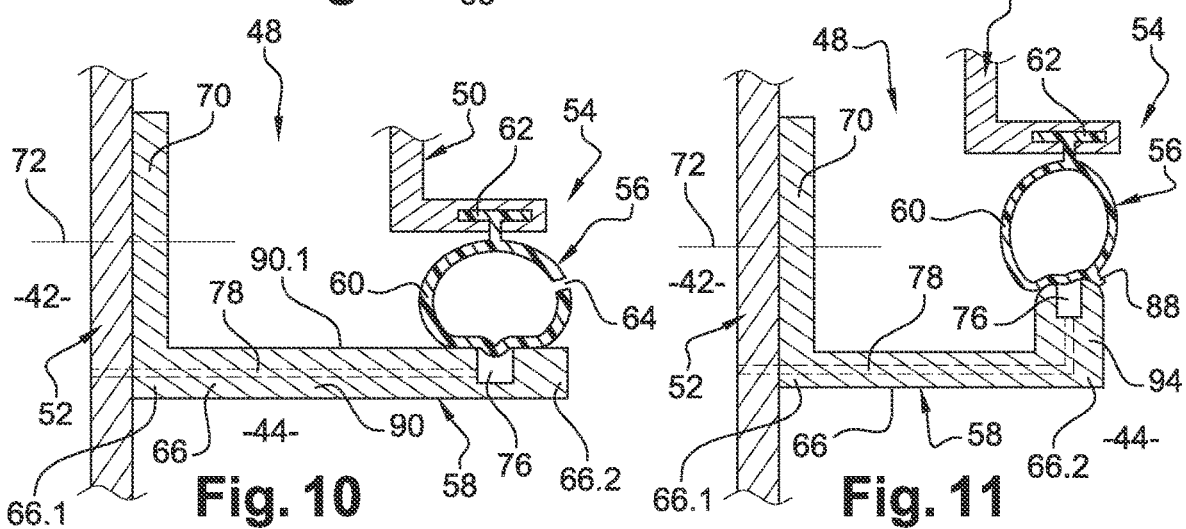

AIRCRAFT COMPRISING A HOLD DOOR FITTED WITH AN IMPROVED SEALING SYSTEM

FIELD OF THE INVENTION

The present invention relates to an aircraft comprising a hold door fitted with an improved sealing system.

BACKGROUND OF THE INVENTION

As illustrated in FIGS. 1 and 2, a fuselage 10 of an aircraft comprises a structure made up of transverse reinforcers known as frames, and of longitudinal reinforcers known as stringers, as well as a skin 12 fixed to the structure which separates the inside and the outside of the fuselage.

For the remainder of the description, the longitudinal direction referenced X is parallel to a longitudinal axis A10 of the fuselage which extends from the nose cone to the tail cone of the fuselage. A transverse plane is a plane perpendicular to the longitudinal axis A10. A longitudinal plane is a plane that passes through the longitudinal axis A10.

The inside of the fuselage 10 is compartmentalized by at least one bulkhead 14 and comprises at least a first zone 16, such as a cabin for example, and at least a second zone 18, such as a hold for example, which zones are separated by the bulkhead 14. In order to allow access to the inside of the second zone 18 from the outside of the aircraft, the fuselage 10 comprises at least one opening 20 and a door 22 able to move between an open position in which it at least partially uncovers the opening 20 and a closed position in which it closes off the opening.

The door 22 comprises a peripheral seal 24, positioned on its interior face, which extends over the entire perimeter of the door. According to one embodiment, the peripheral seal 24 comprises a hollow cylindrical body which has orifices 26 allowing the inside of the hollow cylindrical body to be caused to communicate with the inside of the second zone 18 of the fuselage 10.

The fuselage 10 comprises a doorframe 28 connected to the structure of the fuselage 10 and a stop 30 which comprises:
- a body 32 in the form of a plate which extends over the entire periphery of the doorframe 28, towards the inside of the opening 20, parallel to the door 22 when the latter is in the closed position, and which has a first edge 32.1 fixed to the doorframe 28 and a free second edge 32.2 delimiting the opening 20,
- a rib 34, perpendicular to the body 32, projecting towards the outside of the fuselage 10, positioned at the level of the free second end 32.2, which extends over the entire periphery of the doorframe 28.

The body 32 and the rib 34 are positioned in such a way as to compress the peripheral seal 24 secured to the door 22 when the latter is in the closed position.

The second zone 18 is equipped with a fire-extinguishing system. In the event of a fire during flight, the fire-extinguishing system saturates the second zone 18 with a gas suited to putting out the fire, such as a halon gas for example. Throughout the rest of the flight, until the aircraft lands, the fire-extinguishing system needs to maintain, in the second zone 18, a gas concentration above a given value in order to keep the fire out.

Because there is a leak of gas 36 between the peripheral seal 24 and the rib 32, the fire-extinguishing system comprises an additional reserve of gas for slowly discharging gas into the second zone 18 and keeping the concentration of the gas above the given value. This additional reserve of gas leads to an increase in the mass carried onboard the aircraft.

BRIEF SUMMARY OF THE INVENTION

Aspects of the present invention may overcome the disadvantages of the prior art.

An embodiment of the invention includes an aircraft comprising a fuselage, first and second zones separated by a bulkhead, an opening surrounded by a doorframe and configured to allow access to the second zone from the outside of the fuselage, a door able to move between an open position and a closed position in which it closes off the opening, and a sealing system, interposed between the doorframe and the door, comprising:
- a peripheral seal secured to the door, extending around the perimeter of the door,
- a stop secured to the doorframe, comprising a body in the form of at least one plate which extends around the perimeter of the doorframe, parallel to the door when the latter is in the closed position, having a first edge connected to the doorframe and a free second edge delimiting the opening.

According to an embodiment of the invention, the stop comprises:
- a peripheral groove positioned in such a way that the peripheral seal closes off the peripheral groove around the perimeter of the opening when the door is in the closed position,
- at least one passage configured to cause the peripheral groove and the first zone to communicate.

This design makes it possible, in the event of an incident, to maintain the concentration of the gas injected by the fire-extinguishing system into the second zone thereby reducing the need to discharge gas slowly into the second zone in order to compensate for potential leaks. As a result, the additional reservoir of gas that provides the slow discharge of gas is considerably reduced, making it possible thus to lower the on-board mass.

According to another feature, the stop comprises first and second ribs, secured to the body, projecting towards the outside of the fuselage with respect to the body, extending over the entire periphery of the doorframe, spaced apart in such a way as to delimit, with the body, the peripheral groove.

According to another feature, the first rib is positioned at the level of the second edge of the body of the stop, has a greater height than the second rib and comprises an upper part, distant from the stop, inclined towards the inside of the opening.

According to another feature, the peripheral seal comprises at least one outer rib, projecting with respect to the exterior surface of the peripheral seal, configured to limit the extent to which the peripheral seal can be pushed into the peripheral groove.

According to one configuration, the outer rib of the peripheral seal is configured to bear against the upper part of the first rib.

According to another feature, the peripheral seal comprises a hollow cylindrical body having at least one orifice to cause the inside of the hollow cylindrical body to communicate with the inside of the second zone of the fuselage.

According to one configuration, the opening comprises an upper edge positioned in a first longitudinal plane, a lower edge positioned in a second longitudinal plane, first and second lateral edges positioned in transverse planes; and the stop comprises two passages positioned at the level of the first lateral edge and two passages positioned at the level of the second lateral edge.

According to one embodiment, the stop comprises at least one plate having a first face facing towards the outside of the fuselage and a second face facing towards the inside of the fuselage, each passage being positioned in a bead provided on the second face.

BRIEF DESCRIPTION OF THE DRAWINGS

Further features and advantages will become apparent from the description of the invention which will follow, which description is given purely by way of example with reference to the attached drawings in which:

FIG. 6 is a perspective view of a lateral edge of the opening visible in FIG. 3, FIG. 7 is a perspective view of a corner of the opening visible in FIG. 3, FIG. 8 is a perspective cross section of a stop of the sealing system illustrating the first embodiment of the invention, FIG. 9 is a perspective view of a supply of air to an aircraft door sealing system illustrating the first embodiment of the invention, FIG. 10 is a schematic cross section of an aircraft door sealing system illustrating a second embodiment of the invention, and FIG. 11 is a schematic cross section of an aircraft door sealing system illustrating a third embodiment of the invention.

DETAILED DESCRIPTION

Figure 1:
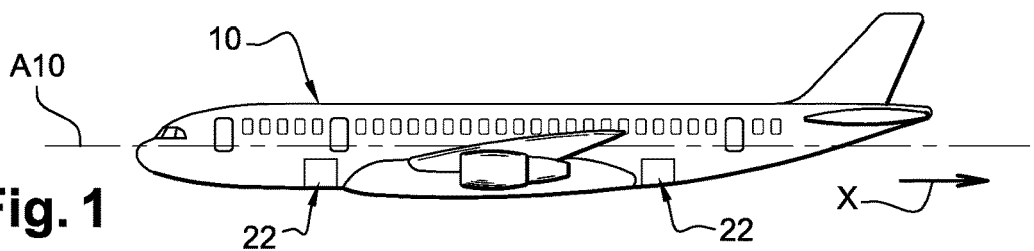
FIG. 1 is a side view of an aircraft.
Figure 2:
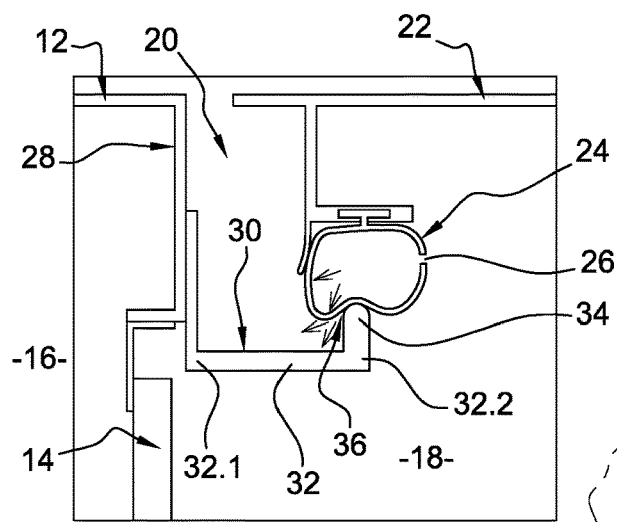
FIG. 2 is a schematic cross section of an aircraft door sealing system illustrating one embodiment of the prior art.

FIGS. 4 to 7 depict a fuselage 40 of an aircraft comprising, inside the fuselage 40, at least a first zone 42 and at least a second zone 44 which are separated by at least one bulkhead 45.

According to one configuration, the first zone 42 is a cabin in which people are installed. The second zone 44 is a hold configured to store luggage or any other goods.

The second zone 44 is equipped with a fire-extinguishing system 46 configured to inject, into the second zone 44, a gas suitable for putting out a fire, such as, for example, a halon gas.

The fuselage 40 comprises at least one opening 48 to allow access to the second zone 44 from the outside of the fuselage 40, and a door 50 able to move between an open position in which it at least partially uncovers the opening 48 and a closed position in which it closes off the opening 48.

The fuselage 40 comprises a doorframe 52 connected to the structure of the fuselage 40 which surrounds the opening 48 and at least one hinge configured to allow the door 50 to move between the open position and the closed position.

The fuselage 40, the first and second zones 42, 44, the bulkhead 45, the fire-extinguishing system 46, the door 50, its hinge and the doorframe 52 are not described further because they may be identical to those of the prior art.

The fuselage 40 comprises a sealing system 54 interposed between the door 50 and the doorframe, and which comprises:
- a peripheral seal 56 secured to the door 50, positioned at the level of an internal face of the door 50 (facing towards the inside of the fuselage 40), which extends over the entire perimeter of the door 50,
- a stop 58 which delimits the opening 48 and which extends over the entire periphery of the doorframe 52, towards the inside of the opening 48.

According to one embodiment, the peripheral seal 56 comprises a hollow cylindrical body 60 and a fixing system 62 configured to connect the hollow cylindrical body 60 and the door 50.

The hollow cylindrical body 60 has at least one orifice 64 to cause the inside of the hollow cylindrical body 60 to communicate with the inside of the second zone 44 of the fuselage 40.

The peripheral seal 56 is made of a material which allows it to deform (more especially to crush) elastically.

The stop 58 comprises:
- a body 66, in the form of at least one plate, which extends over the entire perimeter of the doorframe 52, parallel to the door 50 when the latter is in the closed position, and which has a first edge 66.1 connected to the doorframe 52 and a free second edge 66.2 delimiting the opening 48,
- a first rib 68, secured to the body 66, projecting towards the outside of the fuselage 40 with respect to the body 66, which extends over the entire periphery of the doorframe 52.

According to one embodiment, in order to provide the connection between the stop 58 and the doorframe 52, the stop 58 comprises a flange 70, secured to the body 66 at the level of the first edge 66.1, pressed firmly against the doorframe 52, a plurality of fixings 72 (visible in FIG. 6) providing the connection between the flange 70 and the doorframe 52.

According to one feature of the invention, the stop 58 comprises a second rib 74, secured to the body 66, projecting towards the outside of the fuselage 40 with respect to the body 66, which extends over the entire periphery of the doorframe 52 and is offset with respect to the first rib 68 towards the first edge 66.1.

The first and second ribs 68, 74 are spaced apart in such a way as to delimit, with the body 66, a peripheral groove 76.

The body 66 and the first and second ribs 68, 74 are positioned in such a way that the peripheral seal 56 secured to the door 50 is compressed against the first and second ribs 68, 74 and closes off the peripheral groove 76 when the door 50 is in the closed position.

According to another feature of the invention, the peripheral groove 76 communicates with the first zone 42. To this end, the stop 58 comprises at least one passage 78 having a first end 78.1 opening into the peripheral groove 76, and a second end 78.2 opening into the first zone 42.

In the event of an incident, it is not the gas propelled by the fire-extinguishing system 46 that leaks to outside the aircraft, but the air present in the peripheral groove 76 and coming from the first zone 42 which leaks towards the outside via any leakage path 80 there may potentially be.

Because the first and second zones 42, 44 are initially at the same pressure, the act of injecting a gas into the second zone 44 has a tendency to increase the pressure in the second zone 44 and inside the hollow cylindrical body 60 of the peripheral seal 56, thus generating a pressure difference between the gas present inside the hollow cylindrical body 60 and the air present in the peripheral groove 76. This pressure difference increases the pressure with which the peripheral seal 56 is pressed firmly against the first and second ribs 68, 74 of the stop 58, and this has a tendency to reduce the risks of leakage.

Figure 3:
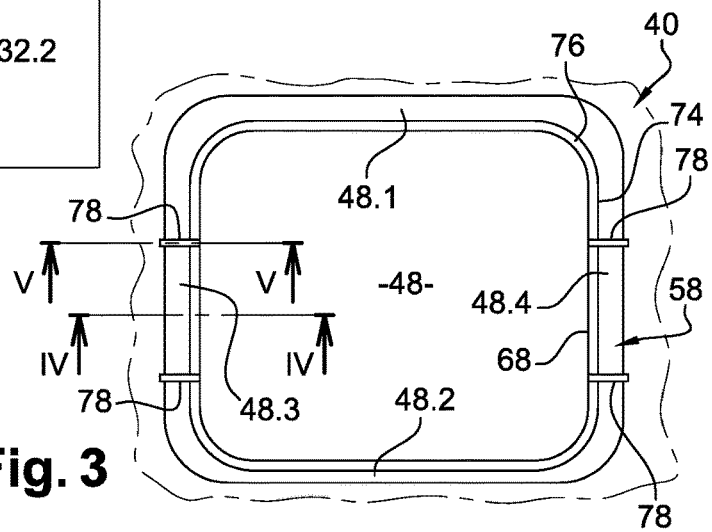
FIG. 3 is a face-on view of an opening formed in an aircraft fuselage, illustrating a first embodiment of the invention.
Figure 4:
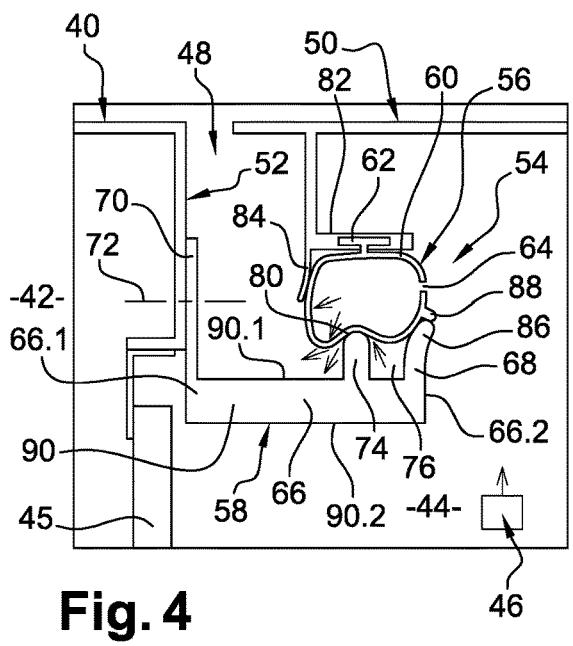
FIG. 4 is a schematic cross section, on IV-IV of FIG. 3, of an aircraft door sealing system illustrating the first embodiment of the invention.
Figure 5:
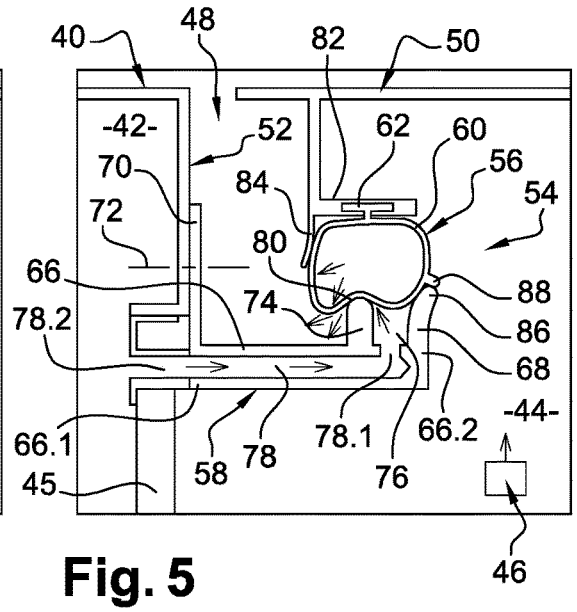
FIG. 5 is a schematic cross section, on V-V of FIG. 3, of an aircraft door sealing system illustrating the first embodiment of the invention.

As illustrated in FIGS. 3 and 4, the sealing system 54 comprises at least one system for correctly positioning the hollow cylindrical body 60 of the peripheral seal 56 with respect to the first and second ribs 68, 74 of the stop 58.

According to one embodiment, the door 50 comprises a baseplate 82 to which the peripheral seal 56 is attached as well as a flange 84 which extends towards the inside of the fuselage from the baseplate 82, the said flange 84 being configured to limit the deformations of the hollow cylindrical body 60 of the peripheral seal 56 towards the doorframe 52.

According to one embodiment, the first rib 68 has a greater height than the second rib 74 and comprises an upper part 86 (distant from the stop 58) inclined towards the inside of the opening 48. This inclination encourages the positioning of the peripheral seal 56 between the first and second ribs 68, 74 and increases the area for contact between the peripheral seal 56 and the first rib 68, this having a tendency to reduce the risks of leakage between the second zone 44 and the peripheral groove 76.

When the door 50 is in the closed position, the peripheral seal 56 is immobilized between the flange 84 and the upper part 86 of the first rib 68.

The peripheral seal 56 comprises at least one outer rib 88, which extends over the entire length of the said seal, projecting with respect to the exterior surface of the peripheral seal 56 and directed towards the middle of the opening 48. This outer rib 88 is configured to bear against the upper part 86 of the first rib 68 and limit the extent to which the peripheral seal 56 can be pushed into the peripheral groove 76.

On another point, the inclination of the upper part 86 of the first rib 68 and the outer rib 88 of the peripheral seal 56 increase the leakage path between the peripheral seal 56 and the first rib 68 and this tends to reduce the risks of leakage between the second zone 44 and the peripheral groove 76.

According to a configuration visible in FIG. 3, the opening 48 comprises an upper edge 48.1 positioned in a first longitudinal plane, a lower edge 48.2 positioned in a second longitudinal plane, first and second lateral edges 48.3, 48.4 positioned in transverse planes, the edges 48.1 to 48.4 being connected by rounded corners, as illustrated in FIG. 7.

According to this configuration, the sealing system 54 comprises four passages 78, two passages 78 positioned at the level of the first lateral edge 48.3 and two other passages 78 positioned at the level of the second lateral edge 48.4.

According to one embodiment, the stop 58 comprises at least one plate 90 which comprises a first face 90.1 facing towards the outside of the fuselage 40, on which the first and second ribs 68, 74 are provided; and a second face 90.2, facing towards the inside of the fuselage. This plate 90 may be planar at the level of the upper and lower edges 48.1, 48.2 of the opening 48, as illustrated in FIG. 7, and curved at the level of the first and second lateral edges in order to conform to the curvature of the fuselage 40, as illustrated in FIGS. 6 and 8.

According to one embodiment visible in FIG. 9, each passage 78 is positioned in a bead 92 provided on the second face 90.2 of the plate 90 of the stop 58.

The body 66, the first and second ribs 68, 74, the flange 70 and the bead 92 may be produced as one and form a single component made of metal or of composite.

According to one embodiment, the stop 58 comprises several sections positioned end to end.

According to a second embodiment visible in FIG. 10, the stop 58 has no rib. It comprises a body 66 in the form of a plate 90 which on one of its faces 90.1 has a peripheral groove 76 which communicates with the first zone 42, positioned in such a way that the peripheral seal 56 closes off the peripheral groove 76 over the entire perimeter of the opening 48 when the door 50 is in the closed position.

According to a third embodiment visible in FIG. 11, the stop 58 comprises a single rib 94 which at its upper edge has a peripheral groove 76 communicating with the first zone 42. The rib 94 is positioned in such a way that the peripheral seal 56 closes off the peripheral groove 76 over the entire perimeter of the opening 48.

The sealing system 54 may just as well be mounted on existing aircraft as on new aircraft.

In a simple and effective way, it makes it possible to maintain the concentration of the gas injected by the fire-extinguishing system 46 into the second zone 44 while reducing the need for gas to be discharged slowly into the second zone 44 to compensate for potential leaks. As a result, the additional gas reservoir used for the slow discharge of gas is greatly reduced, if not to say eliminated, thus making it possible to reduce the on-board mass.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage;
   first and second zones separated by a bulkhead;
   an opening surrounded by a doorframe and configured to allow access to the second zone from the outside of the fuselage;
   a door configured to move between an open position and a closed position in which the door closes off the opening; and
   a sealing system, interposed between the doorframe and the door, comprising:
      a peripheral seal secured to the door, extending around the perimeter of the door;
      a stop secured to the doorframe, comprising a body in the form of at least one plate extending around the perimeter of the doorframe, parallel to the door when the door is in the closed position, having a first edge connected to the doorframe and a free second edge delimiting the opening, wherein the stop comprises a peripheral groove positioned in such a way that the peripheral seal closes off the peripheral groove from the second zone around the perimeter of the opening when the door is in the closed position and at least one passage configured to cause the peripheral groove and the first zone to communicate.

2. The aircraft according to claim 1, wherein the stop comprises first and second ribs, secured to the body, projecting towards the outside of the fuselage with respect to the body, extending over the entire periphery of the doorframe, spaced apart in such a way as to delimit, with the body, the peripheral groove.

3. The aircraft according to claim 2, wherein the first rib is positioned at the level of the second edge of the body of the stop, has a greater height than the second rib and comprises an upper part, distant from the stop, that extends further from the doorframe with increasing distance from the stop.

4. The aircraft according to claim 1, wherein the peripheral seal comprises at least one outer rib, projecting with respect to the exterior surface of the peripheral seal, configured to limit the extent to which the peripheral seal can be pushed into the peripheral groove.

5. The aircraft according to claim 3, wherein the peripheral seal comprises at least one outer rib, projecting with respect to the exterior surface of the peripheral seal, configured to limit the extent to which the peripheral seal can be pushed into the peripheral groove, and wherein the outer rib of the peripheral seal is configured to bear against the upper part of the first rib.

6. The aircraft according to claim 1, wherein the peripheral seal comprises a hollow cylindrical body having at least one orifice to cause the inside of the hollow cylindrical body to communicate with the inside of the second zone of the fuselage.

7. The aircraft according to claim 1, wherein the opening comprises an upper edge positioned in a first longitudinal plane, a lower edge positioned in a second longitudinal plane, first and second lateral edges positioned in transverse planes, and wherein the stop comprises two passages positioned across the first lateral edge and two passages positioned across the second lateral edge.

8. The aircraft according to claim 1, wherein the stop comprises at least one plate having a first face facing towards the outside of the fuselage and a second face facing towards the inside of the fuselage, each passage being positioned in a bead provided on the second face.

\* \* \* \* \*